US011833762B2

(12) United States Patent
Cook et al.

(10) Patent No.: US 11,833,762 B2
(45) Date of Patent: Dec. 5, 2023

(54) REAL-TIME PROCESS MONITORING FOR DIRECT INK WRITE ADDITIVE MANUFACTURING

(71) Applicant: National Technology & Engineering Solutions of Sandia, LLC, Albuquerque, NM (US)

(72) Inventors: Adam W. Cook, Albuquerque, NM (US); Mathias C. Celina, Albuquerque, NM (US); Carl Erik Linde, Albuquerque, NM (US); Leah N. Appelhans, Tijeras, NM (US); Devin J. Roach, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/967,083

(22) Filed: Oct. 17, 2022

(65) Prior Publication Data

US 2023/0158752 A1 May 25, 2023

Related U.S. Application Data

(60) Provisional application No. 63/282,976, filed on Nov. 24, 2021.

(51) Int. Cl.
*B29C 64/393* (2017.01)
*B29C 64/264* (2017.01)
(Continued)

(52) U.S. Cl.
CPC .......... *B29C 64/393* (2017.08); *B29C 64/124* (2017.08); *B29C 64/264* (2017.08);
(Continued)

(58) Field of Classification Search
CPC ................ B29C 64/393; B29C 64/264; B29C 64/124; B33Y 10/00; B33Y 50/02; B33Y 30/00; B33T 30/00
(Continued)

(56) References Cited

U.S. PATENT DOCUMENTS

| 2014/0183792 | A1* | 7/2014 | Leu | B33Y 10/00 264/401 |
| 2020/0353129 | A1* | 11/2020 | Jakus | B33Y 70/10 |
| 2023/0091230 | A1* | 3/2023 | Kalpio | B29C 64/393 264/401 |

OTHER PUBLICATIONS

Rohe et al., "Near Infrared (NIR) Spectroscopy for In-Line Monitoring of Polymer Extrusion Processes", Talanta 50 (1999) 283-290 (Year: 1999).*

(Continued)

*Primary Examiner* — Joseph S Del Sole
*Assistant Examiner* — Lawrence D. Hohenbrink, Jr.
(74) *Attorney, Agent, or Firm* — Kevin W. Bieg

(57) ABSTRACT

Direct ink write (DIW) printing of reactive resins presents a unique challenge due to the time-dependent nature of the rheological and chemical properties of the ink. As a result, careful print optimization or process control is important to obtain consistent, high quality prints. The present invention uses a flow-through characterization cell for in situ chemical monitoring of a resin ink during DIW printing. Additionally, in-line extrusion force monitoring can be combined with off-line post inspection using machine vision. By combining in-line spectroscopy and force monitoring, it is possible to follow reaction kinetics (for example, curing of a reactive resin) and viscosity changes during printing, which can be used for a closed-loop process control. Additionally, the capability of machine vision to automatically identify and quantify print artifacts can be incorporated on the printing line to enable real-time, AI-assisted quality control of the (Continued)

printed products. Together, these techniques can form the building blocks of an optimized process control strategy when complex reactive ink must be used to produce printed hardware.

10 Claims, 15 Drawing Sheets

(51) Int. Cl.
  *B29C 64/124* (2017.01)
  *B33Y 10/00* (2015.01)
  *B33Y 50/02* (2015.01)
  *B33Y 30/00* (2015.01)
(52) U.S. Cl.
  CPC .............. *B33Y 10/00* (2014.12); *B33Y 30/00* (2014.12); *B33Y 50/02* (2014.12)
(58) Field of Classification Search
  USPC ........................................................ 425/166
  See application file for complete search history.

(56) References Cited

OTHER PUBLICATIONS

Lu, Q. Y. and Wong, C. H., "Additive Manufacturing Process Monitoring and Control by Non-destructive Testing Techniques: Challenges and In-Process Monitoring," Virtual and Physical Prototyping, 2018, vol. 13, pp. 39-48.

St. John, N. A. and George, G. A., "Cure Kinetics and Mechanisms of a Tetraglycidyl-4,4'-Diaminodiphenylmethane/Diaminodiphenylsulphone Epoxy Resin using Near I.R. Spectroscopy," Polymer, 1992, vol. 33, pp. 2679-2688.

Roman-Ospino, A. D., et al., "Near Infrared Spectroscopic Calibration Models for Real Time Monitoring of Powder Density," International Journal of Pharmaceutics, 2016, vol. 512, pp. 61-74.

Hailey, P. A., et al., "Automated System for the On-line Monitoring of Powder Blending Processes Using Near-Infrared Spectroscopy Part I. System Development and Control," Journal of Pharmaceutical and Biomedical Analysis, 1996, vol. 14, pp. 551-559.

Tabasi, S. H., et al., "Quality by Design, Part I: Application of NIR Spectroscopy to Monitor Tablet Manufacturing Process," Journal of Pharmaceutical Sciences, 2008, vol. 97, pp. 4040-4051.

Barnes. S. E., et al., "Process Monitoring of Polymer Melts Using In-Line Spectroscopy," Transactions of the Institute of Measurement and Control, 2007, vol. 29, pp. 453-465.

Rohe, T., et al., "Near Infrared (NIR) Spectroscopy for In-Line Monitoring of Polymer Extrusion Processes," Talanta, 1999, vol. 50, pp. 283-290.

Miyai, Y., et al., "PAT Implementation on a Mobile Continuous Pharmaceutical Manufacturing System: Real-Time Process Monitoring with In-Line FTIR and Raman Spectroscopy," Organic Process Research and Development, 2021, vol. 25, pp. 2707-2717.

Fraga, F. et al., "Curing Kinetic of the Epoxy ," Journal of Applied Polymer Science, 2001, vol. 82, pp. 3366-3372.

Lee, C-L. and Wei, K-H., "Curing Kinetics and Viscosity Change of a Two-Part Epoxy Resin During Mold Filling in Resin-Transfer Molding Process," Journal of Applied Polymer Science, 2000, vol. 77, pp. 2139-2148.

\* cited by examiner

REAL-TIME PROCESS MONITORING FOR DIRECT INK WRITE ADDITIVE MANUFACTURING

CROSS-REFERENCE TO RELATED APPLICATION

This application claims the benefit of U.S. Provisional Appl. No. 63/282,976, filed Nov. 24, 2021, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to additive manufacturing and, in particular, to real-time process monitoring for direct ink write additive manufacturing.

BACKGROUND OF THE INVENTION

Since the development of additive manufacturing (AM) methods began in the 1980's, the adoption of AM techniques for production has enabled faster and cheaper product realization with design complexity not accessible through traditional manufacturing methods. See H. Bikas et al., *Int. J. Adv. Manuf. Technol.* 83(1), 389 (2016). As opposed to traditional methods, which either deform a material to the correct shape or remove material until the desired shape is obtained, additive manufacturing refers to a multitude of methods that are used to create parts layer-by-layer. See J. P. Kruth, *CIRP Annals* 40(2), 603 (1991); and J. P. Kruth et al., *CIRP Annals* 47(2), 525 (1998).

Direct ink write (DIW) is a very versatile AM technique, capable of printing a wide variety of materials, such as ceramics, metal-loaded inks and various functional polymers. See J. A. Lewis et al., *J. Am. Ceram. Soc.* 89(12), 3599 (2006); T. Mühler et al., *Int. J. Appl. Ceram. Technol.* 12(1), 18 (2015); B. Mansfield et al., A Review on Additive Manufacturing of Ceramics, *ASME 2019 14th International Manufacturing Science and Engineering Conference (MSEC2019)*; J. W. Halloran, *Annu. Rev. Mater. Res.* 46(1), 19 (2016); J. V. Deckers and J. P. Kruth, *J. Ceram. Sci. Technol.* 5(4), 245 (2014); Q. Mu et al., *Smart Mater. Struct.* 26(4), 045008 (2017); and M. A. Skylar-Scott et al., *Proc. Natl. Acad. Sci.* 113(22), 6137 (2016). These polymeric materials include, for example, thermosetting polymers such as epoxy, epoxy-acrylate and dicyclopentadiene (DCPD) inks, elastomers (e.g. polyurethanes and silicones), liquid crystal elastomers and biomimetic materials. See K. Chen et al., *Soft Matter* 14, 1879 (2018); Z. Zhao et al., *Sci. Adv.* 3(4), e1602326 (2017); Z. Zhang et al., *J. Manuf. Process.* 71, 753 (2021); L. M. Dean et al., *ACS Macro Lett.* 9(6), 819 (2020); S. Camarero-Espinosa et al., *Acta Biomater.* 102, 192 (2020); D. Chalissery et al., *Polymers* 11(6), 1005 (2019); M. M. Durban et al., *Macromol. Rapid Commun.* 39(4), 1700563 (2018); C. J. Thrasher et al., *ACS Appl. Mater. Interfaces* 9(45), 39708 (2017); D. J. Roach et al., *Addit. Manuf.* 41, 101950 (2021); F. Liravi and E. Toyserkani, *Addit. Manuf.* 24, 232 (2018); D. J. Roach et al., *Smart Mater. Struct.* 27(12), 125011 (2018); A. Kotikian et al., *Adv. Mater.* 30(10), 1706164 (2018); B. Y. Ahn et al., *Adv. Mater.* 22(20), 2251 (2010); A. Sydney Gladman et al., *Nat. Mater.* 15(4), 413 (2016); and F. P. W. Melchels et al., *Prog. Polym. Sci.* 37(8), 1079 (2012). Most of these applications make use of reactive resins that can be cross-linked, using either thermal, photo-initiated cure, or a combination of both. See I. D. Robertson et al., *Nature* 557(7704), 223 (2018); N. Rodriguez et al., *Polymers* 13(14), 2239 (2021); X. Kuang et al., *Macromol. Rapid Commun.* 39(7), 1700809 (2018); and Y. Guo et al., *Adv. Eng. Mater.* 21(5), 1801314 (2019). Printing of reactive systems introduces further complexity, however, as the reaction typically causes ink properties to change over time. These effects can be mitigated by initiating the cure reaction after the ink has been dispensed from the nozzle, so that the ink maintains constant properties during extrusion. This can be achieved, for example, by thermal post-print cure of a slowly curing thixotropic material able to maintain its shape, UV curing by a light source attached to the printing nozzle or post-print flood cure, or by exploiting an exothermic polymerization front. See J. P. Lewicki et al., *Sci. Rep.* 7(1), 43401 (2017); H. Chi et al., *ACS Appl. Mater. Interfaces* 14(11), 13758 (2022); Z. Qin et al., *Nat. Commun.* 6(1), 7038 (2015); J. W. Kopatz et al., *Addit. Manuf.* 46, 102159 (2021); 0. D. Yirmibesoglu et al., *Commun. Mater.* 2(1), 82 (2021); A. H. P. S. Jeroen et al., *Proc. SPIE* 12023, 1202308 (2022); J. E. Aw et al., *Adv. Mater. Technol.*, 2200230 (2022); and Z. Zhang et al., *Addit. Manuf.* 102348 (2021). Another route to control the chemical changes is to initiate the cure at a specific point of the print, by in-line mixing of a two-part resin, so that the time between cure initiation and deposition is well defined. See Q. Chen et al., *ACS Appl. Polym. Mater.* 2(12), 5492 (2020); and O. Rios et al., *Mater. Today Commun.* 15, 333 (2018). However, when printing reactive resins, any small change can significantly affect the final properties, and printing parameters must be carefully optimized to yield consistent results or the process monitored and controlled via a feedback loop. For reactive resins that are actively cured during deposition, in-line process monitoring can provide critical information about any chemical or rheological changes occurring, while automated visual inspection of the printed part is crucial for fast quality control.

Real-time process monitoring is a common need of the AM community to assess the quality of printed parts at the time of fabrication, as defects might impact the function of the part. See Q. Y. Lu and C. H. Wong, *Virtual Phys. Prototyp.* 13(2), 39 (2018). For example, optical imaging with automated image analysis to determine bead widths and quality etc., has been employed in, for example, aerosol jet printing (AJP), as well as to provide a layer-by-layer optical tomography images of the printed product. See R. Salary et al., *J. Manuf. Sci. Eng.* 139(2), 021015 (2016); and G. Zenzinger et al., *AIP Conf. Proc.* 1650(1), 164 (2015). Thermal imaging using infrared cameras offers a path to monitor the temperature of a printed coupon during print and has been widely applied to fused deposition modeling (FDM) and laser powder-bed fusion (LPBF). See J. E. Seppala et al., *Soft Matter* 13(38), 6761 (2017); B. Lane et al., *Rapid Prototyp. J.* 22(5), 778 (2016) 778; and S. Moylan et al., *AIP Conf. Proc.* 1581(1), 1191 (2014). Wide-angle X-ray scattering has also been coupled with infrared imaging to monitor and correlate the crystallinity and temperature gradient during extrusion printing of polylactic acid (PLA) structures and to reveal the melting behavior in LPBF. See Y. Shmueli et al., *ACS Appl. Polym. Mater.* 1(6), 1559 (2019); and Y. Wakai et al., *Int. J. Adv. Manuf. Technol.* 110(3), 1047 (2020). Further, optical extinction measurements have been used to track aerosol density in AJP. See R. R. Tafoya et al., *Adv. Mater. Technol.* 5(12), 2000781 (2020).

An analytical technique that has utility for process monitoring is Fourier transform infrared (FTIR) spectroscopy, which offers insight into the molecular structure of materials and is a powerful tool for characterization and analysis of different chemical systems, such as polymers. The exact infrared absorption behavior of a material depends highly on the molecules present and their concentrations, and on their chemical and physical environment. See J. L. Koenig, Chapter 3—Experimental IR spectroscopy of polymers, in: J. L. Koenig (Ed.), *Spectroscopy of Polymers* (Second Edition), Elsevier Science, New York, 1999, pp. 77-145. In terms of process monitoring, FTIR can be utilized to, for example, detect changes in the composition of a mixture, changes in material composition due to chemical reactions, or to monitor for contaminants. There are two main modes of FTIR spectroscopy, namely attenuated total reflection (ATR) and transmission. ATR is a viable option for measurements in the mid-IR region (4000-600 cm$^{-1}$) and for optically opaque materials. The drawbacks are that the penetration depth is shallow (typically <5 μm depending on ATR crystal used) and not well-defined, making quantification challenging. See M. C. Celina et al., *Polym. Degrad. Stab.* 188, 109550 (2021). In addition, for a continuously flowing system, such as typically found in extrusion AM methods, there may be differences in bulk vs interfacial flow that could result in compositional differences. Nevertheless, ATR has been employed to monitor chemical changes in the mid-IR along an extrusion channel with good results. See L. P. Barros et al., *Polym. Test.* 103, 107350 (2021). Transmission FTIR gives information on the average behavior through a flow channel, and due to its well-defined path length (equal to the thickness of the sample), can also be used to quantitatively determine chemical concentrations. However, in the mid-IR range, the penetration depth before most of the light is absorbed is low (<30 μm), which for an extrusion process, would be severely limiting in terms of flow rate. In contrast, near-IR (NIR) can penetrate thicknesses up to approximately 2 mm for materials that are not opaque, and therefore is typically used for transmission measurements.

NIR transmission spectroscopy has been used for in-line process monitoring to measure powder density in pharmaceutical powder blending and tablet manufacturing and to follow material quality and filler loading in the polymer melt during extrusion. See A. D. Román-Ospino et al., *Int. J. Pharm.* 512(1), 61 (2016); P. A. Hailey et al., *J. Pharm. Biomed. Anal.* 14(5), 551 (1996); S. H. Tabasi et al., *J. Pharm. Sci.* 97(9), 4040 (2008); S. E. Barnes et al., *Trans. Inst. Meas. Control* 29(5), 453 (2007); and T. Rohe et al., *Talanta* 50(2), 283 (1999). It has also been used to quantify medicine concentration during extrusion of pharmaceutical solutions. See Y. Miyai et al., *Org. Process Res. Dev.* 25(12), 2707 (2021). Adding this capability for DIW additive manufacturing would enable real-time monitoring of chemical changes in the ink, which could be used for quality control of resin feedstocks, determination of cure states in reactive resins to determine resin pot life, and monitoring of printed part composition. Real-time monitoring could also be used to enable adaptive process control based on variations in the IR spectrum.

Spectral changes that correspond to the evolving cure state are expected to be accompanied by changes in the rheological properties that could affect print quality if not compensated for by changes to the printing parameters. See N. A. St John and G. A. George, *Polymer* 33(13), 2679 (1992). Although viscosity changes can occur for several reasons, such as phase-separation or changing ratios in a mixture, they are especially likely in reactive resin systems with evolving cure. These changes to rheological properties can be measured by monitoring the extrusion force, and the combination of extrusion force and IR monitoring is advantageous as it gives real-time information about both chemical make-up and viscosity during print. The pressure required to extrude a shear-thinning material, assuming a power law to describe the shear rate dependence and no-slip conditions along the wall, is directly proportional to the viscosity. See R. A. Chilton and R. Stainsby, *J. Hydraul. Eng.* 124(5), 522 (1998); and H. Lopez Hernandez et al., *Macromol. Biosci.* 21(2), 2000295 (2021). Thus, monitoring the force (pressure times the cross sectional area) required to extrude the ink can reveal information regarding changes to the viscosity of the fluid. Systems that use pressure control to print, however, cannot employ this monitoring technique as it requires discrete control over volumetric rates of material extrusion. See J. T. Muth et al., *Adv. Mater.* 26(36), 6307 (2014).

SUMMARY OF THE INVENTION

The present invention is directed to a flow-through characterization cell for a direct ink write print head, comprising a transparent flow channel disposed between an ink reservoir and a printing nozzle for flow of an ink therethrough; a light source for optical illumination of the ink flowing in the transparent flow channel; and an optical spectrometer for detection of the light transmitted through or scattered by the ink flowing in the transparent flow channel. The light source can comprise an infrared or Raman light source and the optical spectrometer can comprise an infrared or Raman spectrometer. The detected light can measure a property of the flowing ink, such as a chemical structure or concentration. The ink can comprise a thermosetting resin or a non-thermosetting resin with or without fillers and other modifiers. The characterization cell can further comprise a thermometer. The characterization cell can further comprise a load cell for measuring an extrusion force required to extrude the ink through the printing nozzle. A machine vision system can be used to image the printed ink and correlate a spatially resolved property of the printed ink with a time-dependent property of the flowing ink. A feed-back loop comprising a controller can control a process parameter based on a real-time measurement of a property of the flowing ink or the printed ink.

As an example of the invention, a flow-through characterization cell was constructed to enable in situ near-IR characterization of an ink during DIW printing. DIW printing was demonstrated using reactive resin inks based on epoxy-amine chemistry, and the evolution of the amine peak during printing was monitored. During the printing of the reactive resin, the amine peak decreased as the material cure progressed, and the resulting spectra could be time-resolved and monitored in real-time. The in-print cure kinetics measured during printing were in general similar to those obtained through traditional benchtop FTIR spectroscopy, but with some differences hypothesized to be caused by heating due to the exothermic cure reaction. These discrepancies highlight the importance of process monitoring, particularly for reactive resin inks, as effects from the specific print and instrument setup would not be predicted by benchtop measurements. Additionally, the extrusion force was monitored by an in-line load cell to track changes in ink viscosity during the print. The extrusion force was well resolved and followed a nearly exponential relationship with the extent of cure, in qualitative accordance with previously published literature. The combination of real-time NIR and force monitoring enables tracking of chemical and rheological changes concurrently during print, giving time-resolved information regarding the state of the ink. Additionally, machine vision techniques were developed which enable in situ artifact detection of the printed ink. Using machine vision, printed coupons were evaluated using post-print machine vision for artifact detection, revealing spatial heterogeneities, which were confirmed by FTIR microscopy to most likely be caused by phase separation during print.

Together, these techniques offer unique characterization capabilities that can be integrated into an AI assisted real-time feedback loop for optimized process and quality control of DIW printing. This is particularly useful for printing of reactive resins where the rheological properties are time-dependent, in multi-component printing to maintain an optimal mix ratio, or for detection of impurities in continuous prints.

BRIEF DESCRIPTION OF THE DRAWINGS

The detailed description will refer to the following drawings, wherein like elements are referred to by like numbers.

DETAILED DESCRIPTION OF THE INVENTION

The present invention is directed to an in-line NIR FTIR transmission cell for in situ process monitoring of DIW printing. The following description shows specific examples for monitoring of the extent of cure in epoxy-amine inks with varying cure kinetics, although the technique can be applied to a wide variety of ink systems including thermosetting resins and non-thermosetting resins. In addition, the cure kinetics obtained through the in situ characterization are compared with results of the same epoxy-amine system from a traditional NIR benchtop FTIR. Additionally, the results of in situ extrusion force monitoring and how it relates to the extent of cure during the printing process is also described. Finally, machine vision is employed for post-print inspection of the printed coupon for automated visual control. Machine vision and digital image correlation techniques have previously been successfully applied to additive manufacturing, for example to determine printed line widths and paths for both DIW and FDM, for in situ defect detection and to predict radio frequency behavior of FDM printed parts. See I. Campbell et al., *AIChE J.* 67(12), e17412 (2021); A. A. Armstrong et al., *Biofabrication* 12(1), 015017 (2019); O. Holzmond and X. Li, *Addit. Manuf.* 17, 135 (2017); and D. Sessions et al., *Addit. Manuf.* 50, 102549 (2022). Offline inspection using machine vision after the print is described, although the same techniques can also be used on-line to identify gradients and printing artifacts during print to enable an AI-guided feedback loop for real-time print optimization. While the reactive resin described herein is simplified to show proof of concept for the flow-through characterization cell, the same cell could easily be modified to allow heating for conversion-controlled printing or for detection of impurities in a continuous feed.

Flow-Through Characterization Cell

Figure 1:
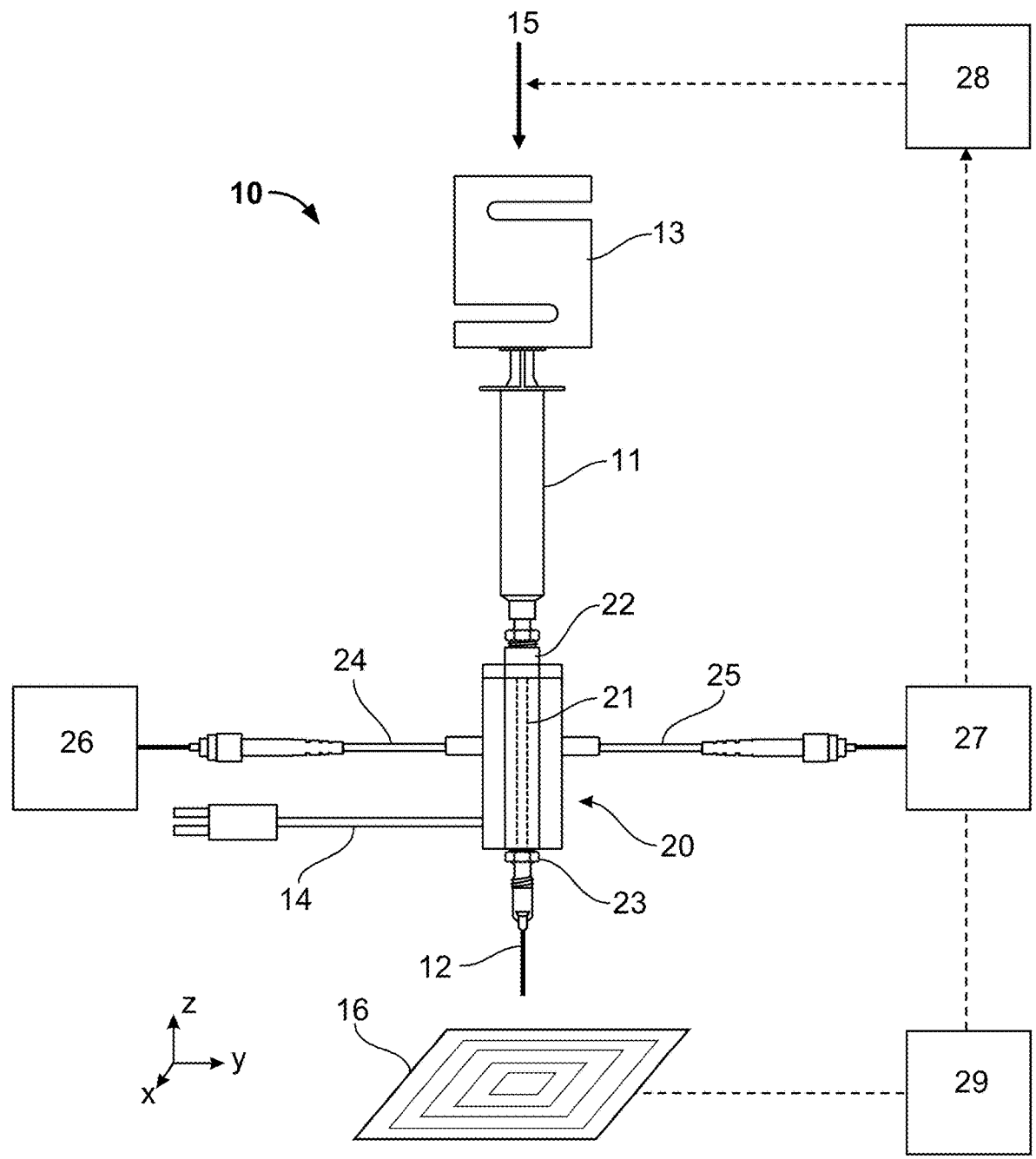
FIG. 1 is a schematic illustration of a flow-through characterization cell.

To enable in-line FTIR measurements during print, a flow-through characterization cell was constructed and attached to a syringe containing resin for DIW printing. A schematic illustration of a print head 10 comprising the exemplary flow-through characterization cell 20 is shown in FIG. 1. The flow-through characterization cell 20 comprises a transparent flow channel or tube 21 (e.g., a quartz capillary) placed concentrically between the inlet 22 and outlet 23 of the flow cell 20. The inlet side 22 of the flow cell was formed to accept a luer-lock fitting for coupling to an ink reservoir (syringe) 11. The outlet side 23 of the flow cell was formed to accept a luer-lock fitting for direct coupling to a printing nozzle 12 and deposition tip. The flow-through cell body was printed using stereolithography. The flow cell 20 was formed to accept two fiber-optic collimating lenses 24, 25 which were positioned orthogonal to the quartz capillary 21 and concentric with each other. An infrared (IR) light source 26 and in-line spectrometer 27 were coupled to the collimating lenses 24, 25 of the optical port (in) and optical port (out), respectively, using fiberoptic cables (note that the flow channel only needs to be transparent at the optical ports to allow source light in and detected light out). Alternatively, a Raman probe can be used to obtain spectroscopic information on vibration modes of the ink. Ink can be pumped through the flow-through characterization cell 20 with the syringe 11 and IR absorption spectra can be continuously acquired as the ink flows through the cell 20. The force required to pump the ink through the cell 20 and print nozzle 12 can also be observed in real time via a load cell 13. Essentially, this provides a capillary rheometer whereby rheological properties, such as melt viscosity, sheer rate dependencies, and stress relaxation of the ink can be determined from the extrusion force. An integrated thermometer 14 (e.g., thermocouple or resistive temperature sensor), can be used to measure the temperature of the print head during 3D part construction. Direct measurement of these process conditions also enables in situ rheological characterization and determination of reaction kinetics for custom ink resins used with extrusion printing. A machine vision system 29 can image the printed ink and correlate a spatially resolved property of the printed ink (e.g., printing artifact, phase separation, hardness) with a time-dependent property of the flowing ink (e.g., viscosity, extrusion rate, IR peak area). With the incorporation of a feed-back loop comprising a controller 28, the process parameters (for example, extrusion rate, mix ratio in a two-component system, or temperature in a heated IR cell setup) can be controlled based on a real-time flowing or printed ink measurement.

DIW processing was performed on a custom engineered printing system consisting of a computer-controlled X-Y-Z motion system and data acquisition capability. A linear actuator 15 affixed to the Z-axis of the motion system served as an extrusion pump and enabled precise volumetric deposition of material from the syringe 11. The load cell 13 positioned between the linear actuator 15 and the syringe 11 provided for real-time extrusion force measurement during the entire printing process. Sample coupons, 75×75 mm, of printed ink 16 were printed in a concentric square pattern onto clad aluminum plates and required approximately 1 h to build. The relatively slow printing speed was chosen to obtain measurable spectroscopic changes over the duration of the print. A faster-curing system would allow for shorter print times but increases the risk of excessive heating of the deposition syringe due to the exothermic cure reaction. Relevant printing conditions are provided in Table 1.

TABLE 1

DIW Printing conditions and test coupon details

| Nozzle size (mm) | Printing speed (mm s$^{-1}$) | Extrusion rate (ml s$^{-1}$) | Build orientation details |
|---|---|---|---|
| 1.19 | 1.5 | 1.66837 × 10$^{-3}$ | Concentric square Single layer, inward fill 0.238 mm XY overlap |

FTIR analysis using the flow-through cell was performed using an in-line NIR spectrometer using 600 μm diameter fiber-optic cables, a broad-band halogen light source and acquisition software. Acquisition time was set to 80 ms per scan, with a resolution of 4 cm$^{-1}$ and 8 scans averaged per spectrum over the range 12000-4000 cm$^{-1}$. Spectral smoothing was obtained using instrument-integrated 1-boxcar averaging, i.e., each spectral point was averaged with the nearest neighboring points towards higher and lower wavenumbers, with the averaging window size depending on wavenumber but approximately 8 cm$^{-1}$ on average. Spectral integration was performed in MATLAB using local baselines between the minima to the left and right of the peaks of interest.

Using the flow-through characterization cell described above, it is possible to generate a process history mapping that describes material states and printing process conditions for DIW printed parts with respect to time material voxel location, including ink composition, extrusion rate, extrusion force, and extrusion temperature. In particular, using absorption IR or Raman scattering spectroscopy, the chemical composition or functional groups of the ink can be determined at the time of printing/material extrusion. Using the load cell/transducer, the force associated with a constant volumetric rate of material extrusion can be measured. Measurement of extrusion force required can be used to detect transitions between printed layers, steady state flow conditions, changes in material state of cure, rheological instabilities, bubbles in the ink, and clogs that may develop during printing. The IR spectra and extrusion force as observed during printing of an ink can be correlated with specific points, layers, or internal regions of a 3D printed part formed with the ink. Thermal mapping can also be obtained using the thermometer (e.g. thermocouple or a resistive temperature sensor). When coupled with the position location information easily obtained from a motion control system, a virtual reconstruction of a 3D printed part can be generated.

Assessment of Cure Kinetics Using Conventional Benchtop FTIR Spectroscopy

The characterization cell of the present invention can be used to monitor DIW of a wide variety of ink systems including thermosetting resins, such as epoxies, acrylates, epoxy/acrylates, polyurethanes, phenols, siloxanes, epoxy/siloxanes, metathesis polymers, and some polyimides, and non-thermosetting resins, such as liquid crystal elastomers, polycarbonates, polyethylene oxides, and some polyimides. The following description shows specific examples for in-line monitoring of an exemplary epoxy-amine inks with varying cure kinetics.

The exemplary ink system comprised an amine-cured epoxy at stoichiometric ratios (1:0.181 epoxy to amine by mass), in which the amine curing agent reacts with the epoxy resin to form the crosslinked epoxy-amine thermoset. This reaction can be accelerated by the addition of nonylphenol, which aids the opening of the epoxide ring by donating a proton to the amine-epoxide complex (due to the acidity of nonylphenol) and hydrogen bonding in the transition state. See L. Shechter et al., *Ind. Eng. Chem.* 48(1), 94 (1956). Specifically, the exemplary ink used for assessing the FTIR characterization capabilities was comprised of Epon 828 (diglycidyl ether of bisphenol A) epoxy in stoichiometric mixtures with m-xylylene diamine (MXD) curing agent with 0, 2, 4 and 8 wt % nonylphenol added to accelerate the curing reaction. A higher concentration of nonylphenol is expected to further increase the rate of cure. The exact formulations are shown in Table 2. Before printing, 4% (by weight) fumed silica was added to the epoxy resin to introduce thixotropy and enable material to flow under shear stresses while ceasing to flow when no extrusion force is applied. See L. Li et al., *Chem. Eur. J.* 25(46), 10768 (2019); and J. A. Lewis, *Adv. Funct. Mater.* 16(17), 2193 (2006).

TABLE 2

Epoxy-amine formulations used for DIW printing.

| Sample | Epon 828 (g) | MXD (g) | Nonylphenol (g) |
|---|---|---|---|
| 0% Nonylphenol | 12.020 | 2.180 | 0 |
| 2% Nonylphenol | 11.974 | 2.171 | 0.285 |
| 4% Nonylphenol | 11.188 | 2.032 | 0.549 |
| 8% Nonylphenol | 10.435 | 1.892 | 0.987 |

Figure 2:
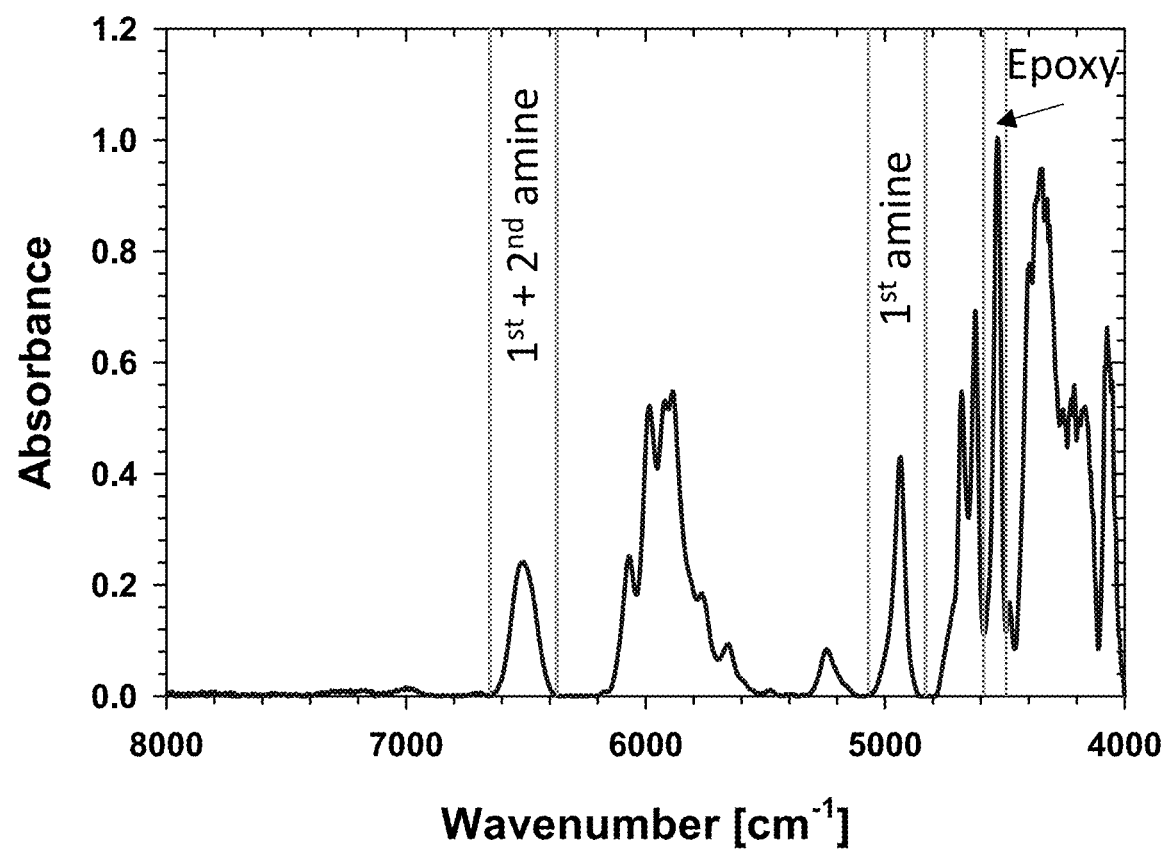
FIG. 2 is an absorbance spectrum of an Epon 828/MXD system containing 2% nonylphenol obtained using a benchtop spectrometer at room temperature (25° C.). Peaks of interests are marked with vertical lines.
Figure 3A:
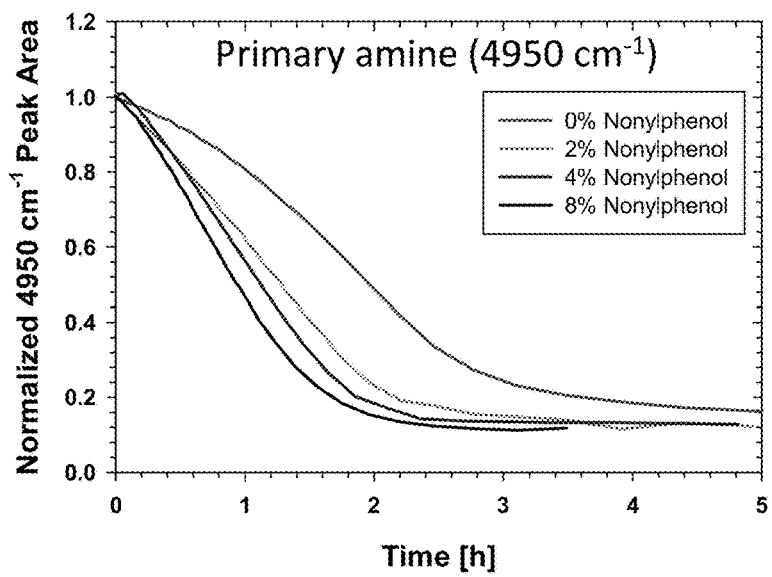
FIG. 3A is a graph of the time-evolution of the primary amine peak area during cure of Epon 828 and MXD with varying amounts of nonylphenol.
Figure 3B:
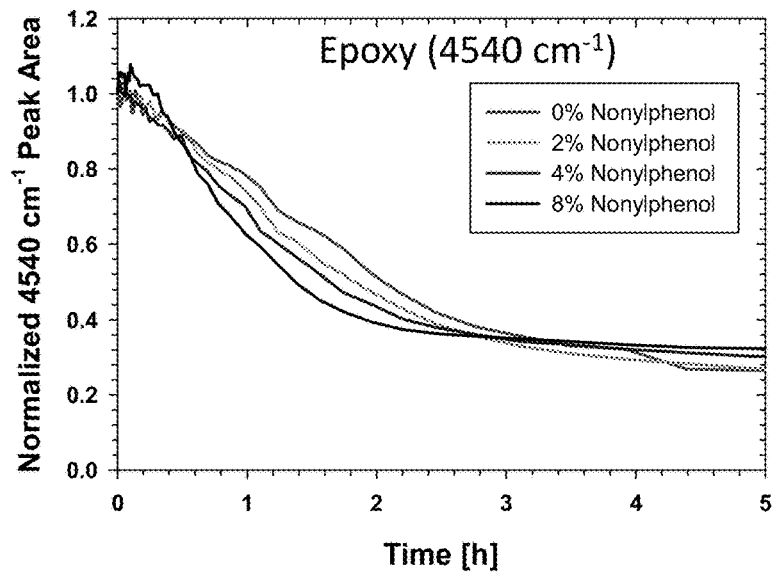
FIG. 3B is a graph of the time-evolution of the epoxy peak area.
Figure 3C:
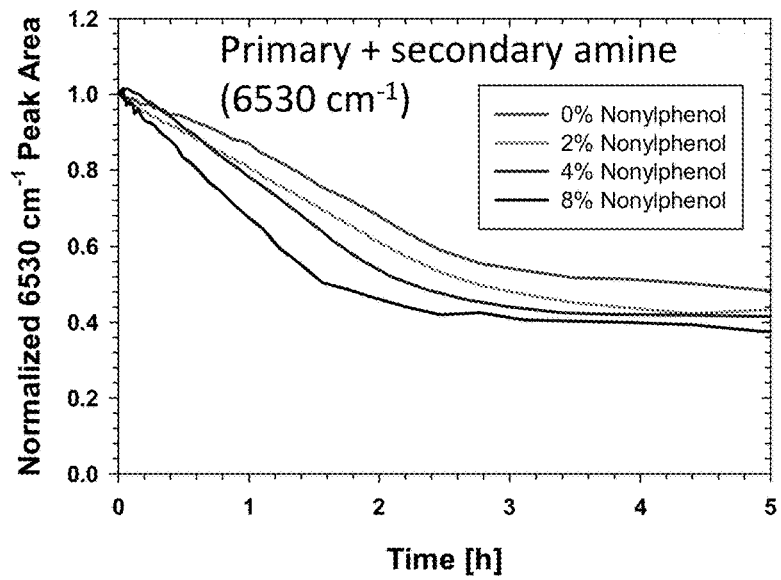
FIG. 3C is a graph of the time-evolution of the primary+secondary amine peak area. Data were obtained using a benchtop spectrometer at 25° C.

FTIR spectroscopy can offer time-resolved measurements of the cure kinetics by following the evolution with time of the relevant peaks. A benchtop spectrometer was used to characterize the cure kinetics of the exemplary epoxy-amine system off line to allow for comparison to the smaller in-line spectrometer used for in situ monitoring. The benchtop spectrometer was equipped with a broad-band NIR light source and a InGaAs room temperature (RT) detector. In the NIR range, the amine and epoxy peaks are normally well resolved allowing for good quantification. An example spectrum of the Epon 828/MXD system as obtained by the benchtop system is shown in FIG. 2. The peaks of interest for this particular system are also marked, showing the combined primary and secondary amine (6530 cm$^{-1}$), primary amine (4950 cm$^{-1}$) and epoxy (4540 cm$^{-1}$) peak locations. See M. G. González et al., Applications of FTIR on Epoxy Resins—Identification, Monitoring the Curing Process, Phase Separation and Water Uptake, in *Infrared Spectroscopy—Materials Science, Engineering and Technology*, IntechOpen, London, 2012. FIGS. 3A-3C show the time-evolution of these peaks. There is a marked decrease in peak areas as the cure progresses. However, even after 20 h of curing at 25° C., there is still significant unreacted resin, as evidenced by approximately 35% of the epoxy peak remaining. This decreasing rate and incomplete conversion are likely due to vitrification. Vitrification occurs when the glass transition temperature of the system, which increases as the cure progresses, reaches the ambient temperature and significantly reduces chain mobility. See J. Lange et al., *Polymer* 41(15), 5949 (2000). A thermal post-cure at 100° C. for 1 h reduces the epoxy peak area to 3% of its initial value. The addition of more nonylphenol increased the reaction rate as expected, with an increased rate of consumption of amines and epoxy. Interestingly, the primary amine consumption in the 0% sample appears delayed compared to other bands. Increasing the nonylphenol content does not seem to affect the 'final' extent of conversion after 24 h of RT cure, but before high temperature post cure, suggesting that it does not significantly alter the glass transition temperature of the cured material.

In Situ Cure Monitoring Using In-Line FTIR Spectroscopy

Figure 4:
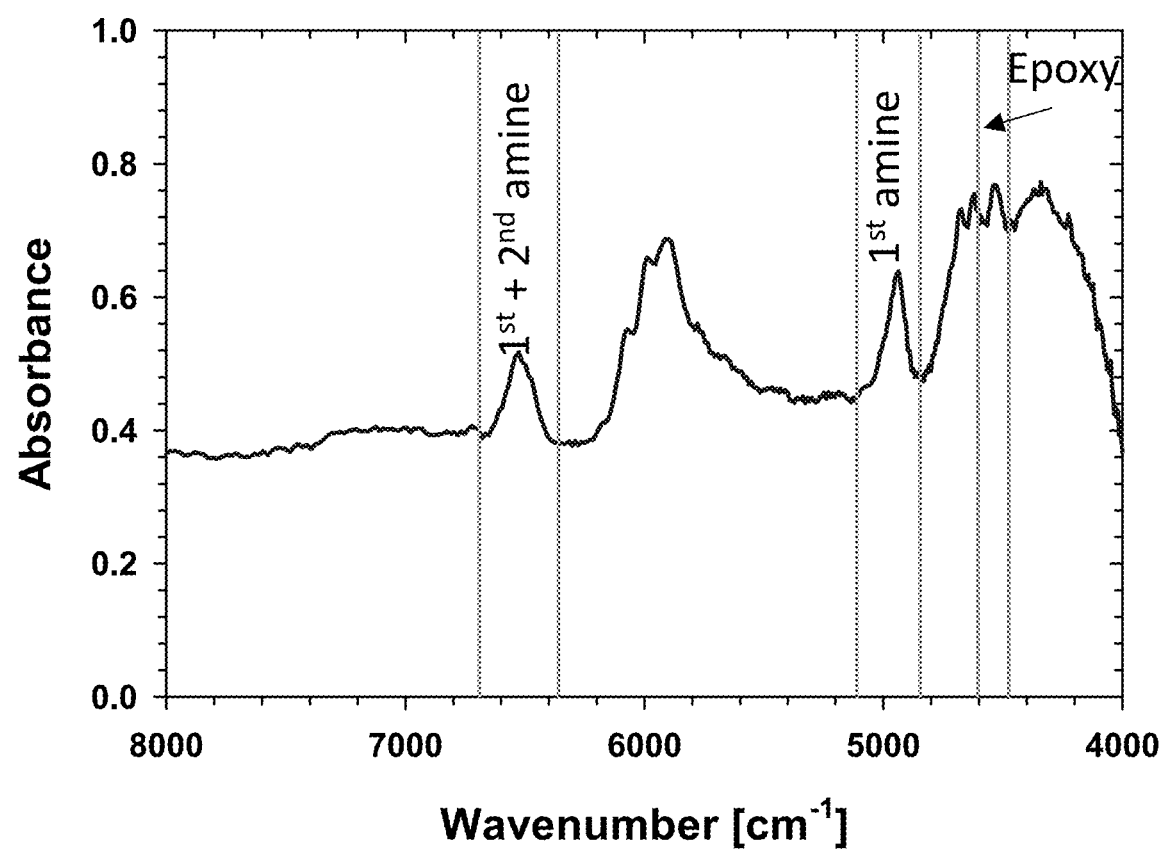
FIG. 4 is an absorbance spectrum of the Epon 828/MXD system containing 2% nonylphenol obtained during DIW printing using an in-line spectrometer at 25° C. Peaks of interests are marked with vertical lines.

While the benchtop spectrometer enables measurements of the cure kinetics, the setup is not compatible with in-line measurements for DIW printing. However, it provides a good point of reference to compare to the fiberoptic-based flow-through cell results. An example spectrum obtained with the in-line spectrometer during printing is shown in FIG. 4, again with the relevant peaks denoted. The spectral quality is lower, potentially due to insufficient thermoelectric cooling and the miniaturized interferometer, particularly for the epoxy peak, which is masked by the background peak likely stemming from C-H stretching peaks. See J. J. Workman, *Appl. Spectrosc. Rev.* 31(3), 251 (1996). Additionally, there is a strong vertical shift, and local baseline correction is required to obtain relevant peak areas. The peaks for both primary amines (~4950 cm$^{-1}$) and the combined primary and secondary amines (6530 cm$^{-1}$) are relatively well-resolved, allowing for accurate integration limits.

Figure 5A:
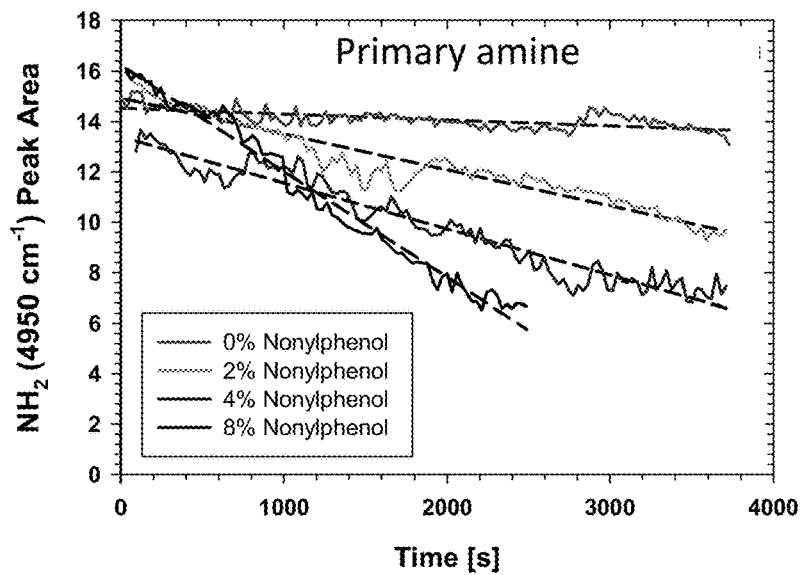
FIG. 5A is a graph of the time-evolution of the primary amine peak area during cure of Epon 828 and MXD with varying amounts of nonylphenol.
Figure 5B:
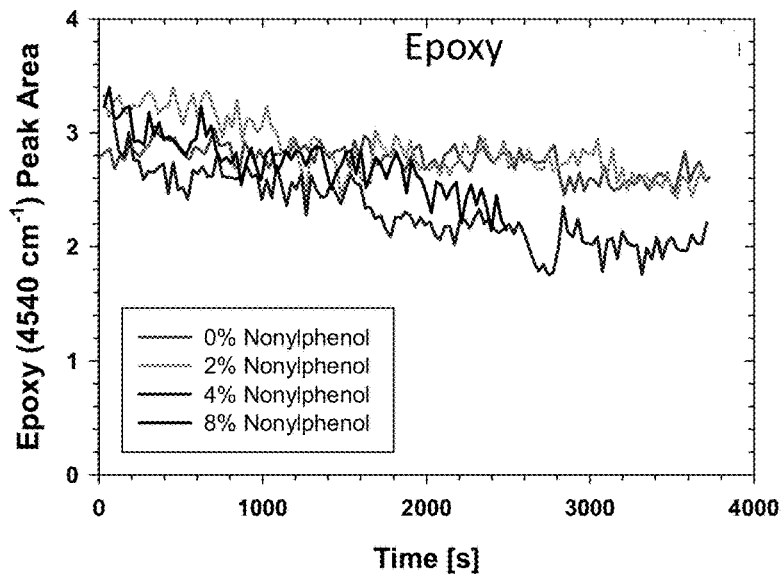
FIG. 5B is a graph of the time-evolution of the epoxy peak area.
Figure 5C:
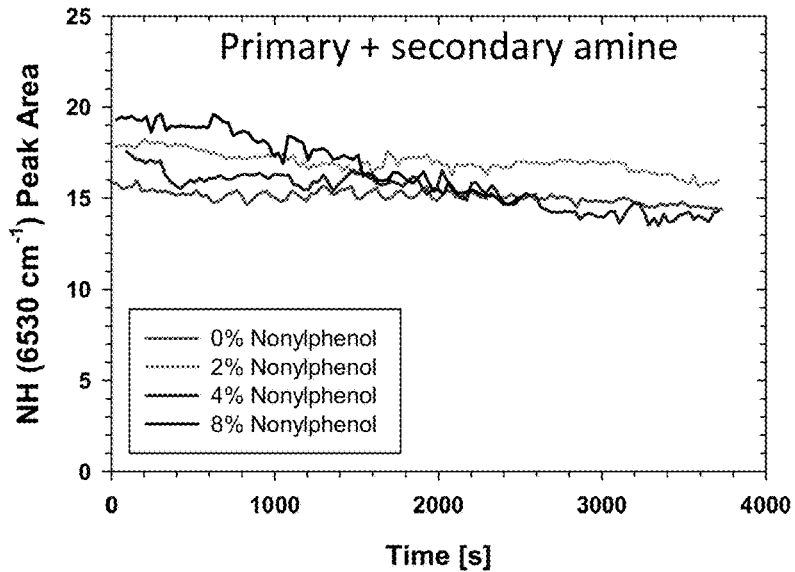
FIG. 5C is a graph of the time-evolution of the primary+secondary amine peak area. Data were obtained during DIW print using an in-line spectrometer at room temperature. Dashed lines in FIG. 5A represent linear fits to the data.

The time-evolution of the areas of the three peaks is shown in FIGS. 5A-5C. For the system containing no nonylphenol, there is only a small change in the primary amine peak area, approximately a 6% decrease over 3600 s, while the system with 8% nonylphenol showed a decrease in peak area by almost 65% over the printing time (2500 s, stopped early due to rapid increase in extrusion force required for print). Corresponding decreases for the 2% and 4% nonylphenol systems were 34 and 50% over 3600 s, respectively. For the epoxy area, the peak area decreased by 10, 21 and 32% over 3600 s for 0, 2 and 4% nonylphenol, and 36% over 2500 s for the 8% system. Finally, the combined primary and secondary amine peak area decreased by 5, 8, 18 and 26% for 0, 2, 4 and 8% nonylphenol, respectively, once again with the print for 8% being shorter. These results are summarized in Table 3. These results show a limitation of the selected spectrometer, as the relative decrease in epoxy and combined amine peak areas should be equal, and at least half as large as the decrease in primary amine. See M. G. González et al., Applications of FTIR on Epoxy Resins—Identification, Monitoring the Curing Process, Phase Separation and Water Uptake, in *Infrared Spectroscopy—Materials Science, Engineering and Technology*, IntechOpen, London, 2012. The discrepancies are likely due to the lower-quality spectra, particularly for the epoxy peak. The starting peak areas also vary considerably for the four formulations despite their similar epoxy to amine ratios. The reason for these variations is currently unknown, as the path length is constant (fixed quartz tube diameter), and there is no clear trend with nonylphenol concentration (which would effectively dilute the solution, although this effect would be minimal). From FIGS. 5A-5C, it also evident that there is substantial noise in the in-line time-dependent data, which makes exact determination of the kinetics difficult. Nevertheless, the flow-through FTIR concept is capable of following chemistry changes in the ink over time, and could be improved through the use of a more sensitive spectrometer (i.e. a dedicated benchtop unit with fiberoptic capability) and potentially by using a rectangular flow path to avoid light scattering on the capillary tube curvature. The latter approach may, however, introduce undesired flow-patterns.

TABLE 3

Summary of relative peak area decreases observed with in situ processing monitoring during DIW printing of Epon 828/MXD systems containing various levels of nonylphenol. Total print time was 3600 s for the samples containing 0, 2 and 4% nonylphenol and 2500 s for the 8% sample.

| Sample | Decrease in primary amine, 4950 $cm^{-1}$ (%) | Decrease in epoxy, 4540 $cm^{-1}$ (%) | Decrease in combined amines, 6530 $cm^{-1}$ (%) |
|---|---|---|---|
| 0% Nonylphenol | 6 | 10 | 5 |
| 2% Nonylphenol | 34 | 21 | 8 |
| 4% Nonylphenol | 50 | 32 | 18 |
| 8% Nonylphenol | 65 | 36 | 26 |

Figure 6:
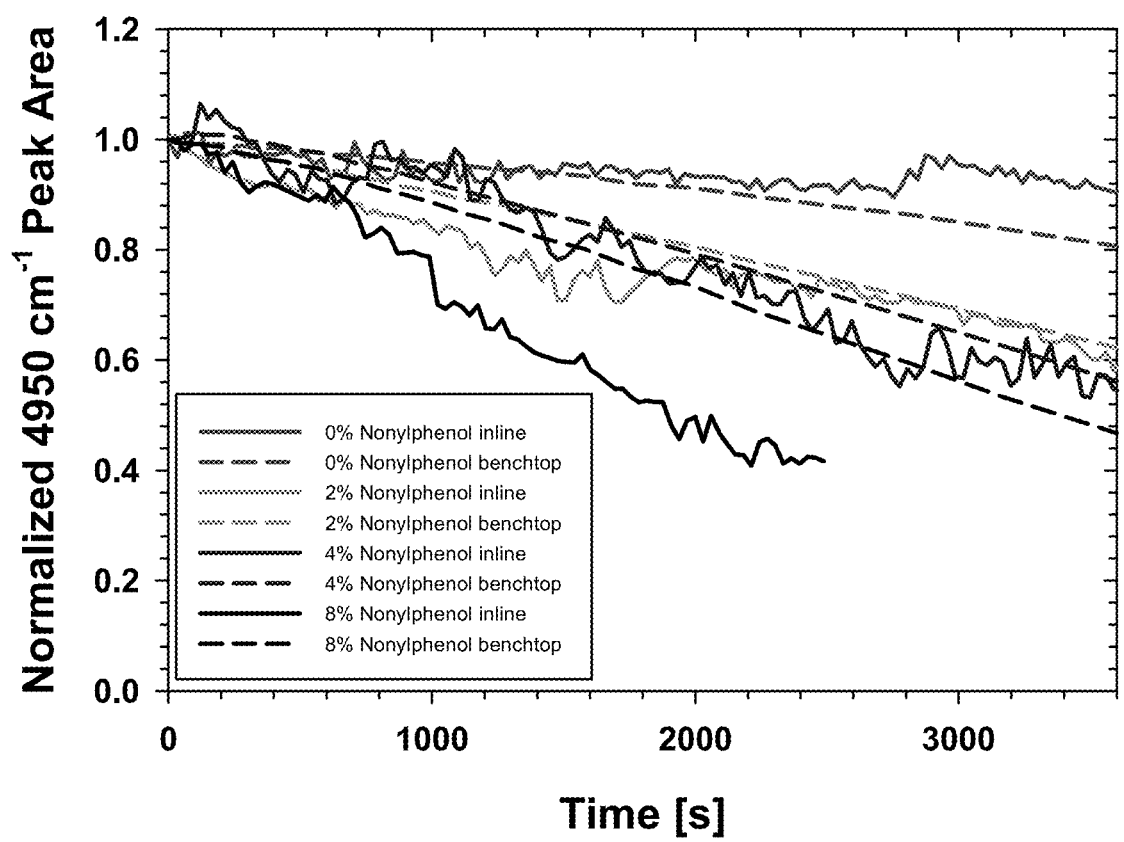
FIG. 6 is a graphic comparison of cure kinetics at room temperature as measured by in-line (solid lines) and benchtop (dashed lines) FTIR spectroscopy for the Epon 828/MXD system with varying concentrations of nonylphenol.

Finally, FIG. 6 shows the comparison between kinetic data obtained from the benchtop spectrometer and the in-line spectrometer. There is general agreement between the two methods for the systems containing 0, 2, and 4% nonylphenol, but for the 8% nonylphenol ink there are significant discrepancies between the two measurements. This is likely due to heating of the deposition syringe from the rapid exothermic reaction, leading to auto-accelerated cure kinetics, which would not be observed in the benchtop or rheology experiments due to the small volume of resin. Such discrepancies highlight the need for process monitoring of DIW printing of reactive systems, as the differences in experimental setup between benchtop FTIR or rheology experiments and printing introduce additional variables that are difficult to account for in ex situ experiments. Additionally, while shear stresses are not expected to affect the spectral features in IR, it might affect the cure kinetics, which would be difficult to adjust for in a typical benchtop FTIR setup. See N. W. Radebe et al., *J. Rheol.* 65(4), 681 (2021); and C. D. Han and K.-W. Lem, *J. Appl. Polym. Sci.* 28(10), 3155 (1983).

Relationship Between Extrusion Force and Extent of Curing

Figure 7:
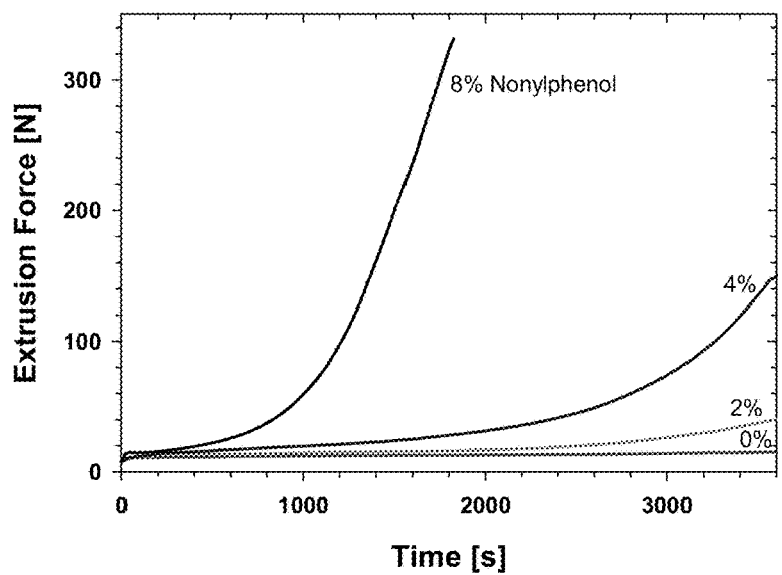
FIG. 7 is a graph of extrusion force as a function of time during DIW printing at room temperature of a reactive epoxy-amine system with various concentrations of nonylphenol (marked in the figure). The print of the 8% nonylphenol ink was prematurely aborted to avoid exceeding the capacity of the load transducer.
Figure 8:
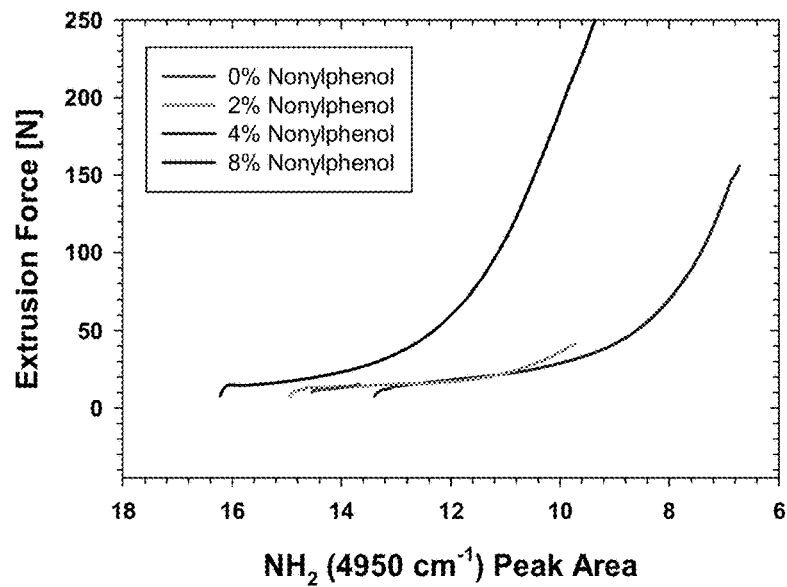
FIG. 8 is a graphic comparison between extrusion force and amine peak area, which decreases as the extent of cure increases, during printing at room temperature of an Epon 828/MXD system with varying amounts of nonylphenol.

As the curing reaction of the reactive resin proceeds, it is expected that the viscosity of the ink will increase, and, as seen in FIG. 7, there is a marked increase in extrusion force over time during the print. The data shows clear differences between the different nonylphenol concentrations and captures the material changes well. For the ideal case, a certain degree of cure would correspond to a certain extrusion force, as the whole volume of ink is curing homogeneously. FIG. 8 shows the comparison between extrusion force and amine peak height, and for the systems with 0, 2 and 4% nonylphenol, there is a clear trend between the two properties. Once again, however, the 8% nonylphenol ink shows a different behavior, with significantly higher extrusion force at a given amine peak area. This is suspected to stem from two contributions, namely that the amine peak starts higher (FIG. 5A) which means that an equivalent epoxy conversion would occur with a higher remaining amine content, and due to heating of the resin in the syringe due to the exothermic cure reaction. As the resin volume heats up, the bulk of the resin cures faster than in the narrower flow-cell, which has higher heat dissipation, which causes a discrepancy between viscosity changes measured in the bulk and the extent of conversion measured in the flow-through cell by the spectroscopic probe. An optimized in situ monitoring setup for a reactive resin would use a temperature-matched heated flow-cell and syringe, so that the cure kinetics are better controlled, or a multi-component system that is mixed as it is extruded. See O. Rios et al., *Mater. Today Commun.* 15, 333 (2018). For such a setup, there would be no ongoing cure of the reservoir material and all curing would occur over a defined time (i.e. the time after mixing). The FTIR response, either time-averaged or through a more sensitive spectrometer, could easily be used as a feedback signal to adjust the cure rate through temperature changes or to adjust extrusion rates of a multi-component system.

Figure 9:
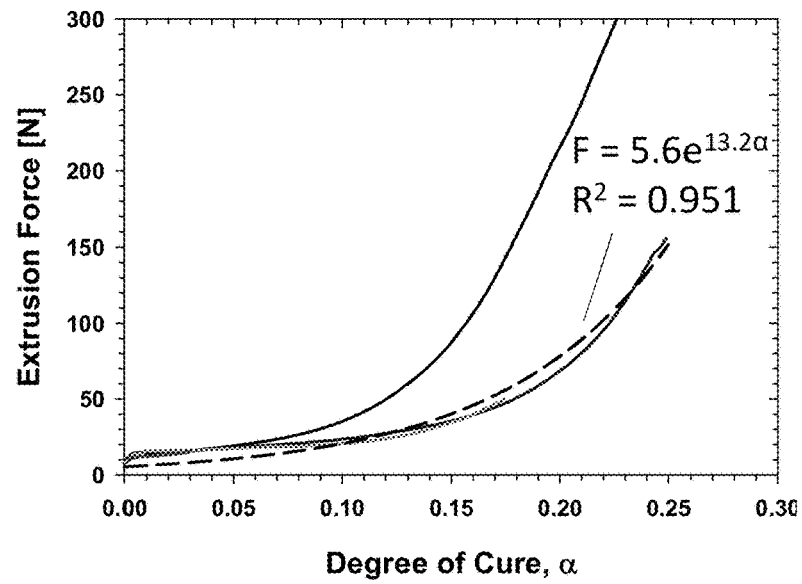
FIG. 9 is a graph of extrusion force as a function of degree of cure (calculated assuming only primary amines react). Solid lines represent experimental data while the dashed black line represents the best exponential fit for the 0, 2 and 4% nonylphenol systems with equation as listed, where F is the extrusion force and a is the degree of cure (1 being fully cured).

It is of interest to determine if the relationship between amine peak area (which can, under certain conditions, be used to quantitatively determine degree of cure) and extrusion force is in agreement with previously published data. See F. Fraga et al., *J. Appl. Polym. Sci.* 82(13), 3366 (2001). Lee et al. reported an exponential increase in viscosity as a function of the degree of cure for a 2-functional epoxy cured with a 4-functional amine, similar to Epon 828 and MXD described herein. See C.-L. Lee et al., *J. Appl. Polym. Sci.* 77(10), 2139 (2000). FIG. 9 shows this comparison, with the degree of cure calculated using the assumption that only primary amines react with the epoxy (the primary amine-epoxy reaction is initially significantly faster than the corresponding reaction between secondary amines and epoxies). See J. Mijovic et al., *Macromolecules* 27(26), 7589 (1994). Additionally, it is assumed that, at full conversion, the peak area is equal to zero. This may not be the case as there may be overlapping peaks interfering, and to resolve this a spectrum after full conversion (typically after post-cure at high temperature) would have to be obtained for the specific experimental setup. As discussed above, extrusion force is proportional to the ink viscosity, and thus a similar exponential increase in the extrusion force as a function of degree of cure would be expected. See R. A. Chilton and R. Stainsby, *J. Hydraul. Eng.* 124(5), 522 (1998). Similar to the data presented in FIG. 8, which was used as basis for the degree of cure estimations, the sample containing 8% nonylphenol diverges strongly. However, the 0, 2 and 4% resins overlap well, and the dashed line in FIG. 9 shows an exponential fit to the data with reasonable agreement. Some of the discrepancy likely stems from the noise in the FTIR data (FIG. 5A) and that there likely are some secondary amines participating in the cure reaction. Overall, the extrusion force and FTIR data offer complementary information on the material changes occurring during print. Note, however, that this is a qualitative comparison only, as the exact exponential behavior will depend on the specific material used and the cross-sectional area. To avoid influences of the noisy spectra on, and assumptions inherent in, the conversion calculations hereafter focus mainly on the smoothed.

Rheological Changes During Cure of the Epoxy-Amine System

Figure 10A:
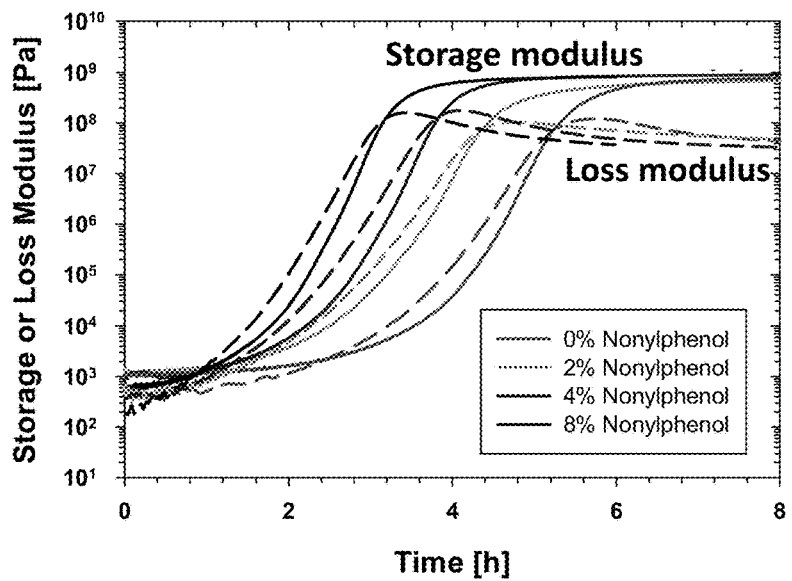
FIG. 10A is a graph of storage (solid lines) and loss (dashed lines) modulus as a function of cure time at room temperature for the Epon 828/MXD system with varying amounts of nonylphenol accelerant.
Figure 10B:
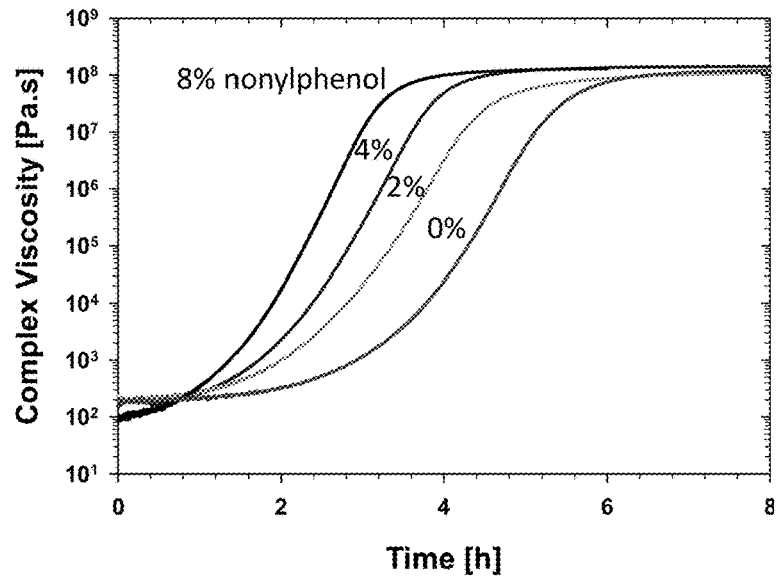
FIG. 10B is a graph of complex viscosity.
Figure 10C:
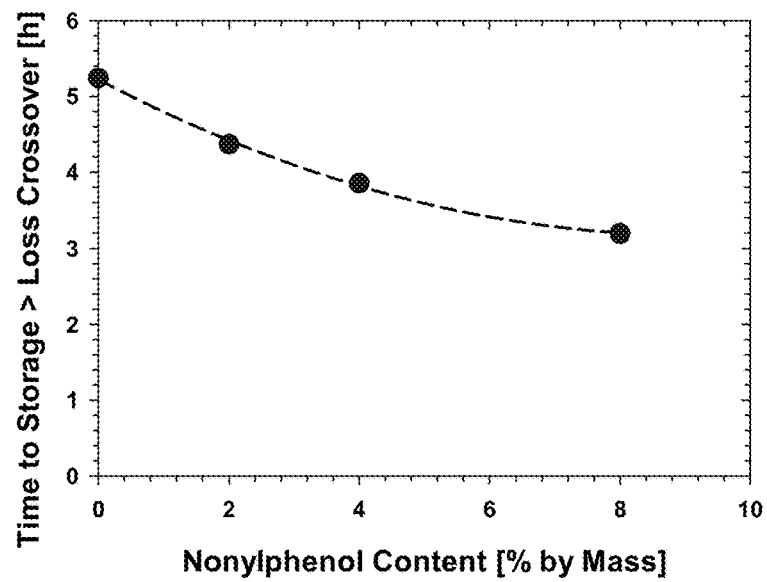
FIG. 10C is a graph of the time where storage modulus becomes greater than the loss modulus approximately corresponding to gel time.
Figure 11A:
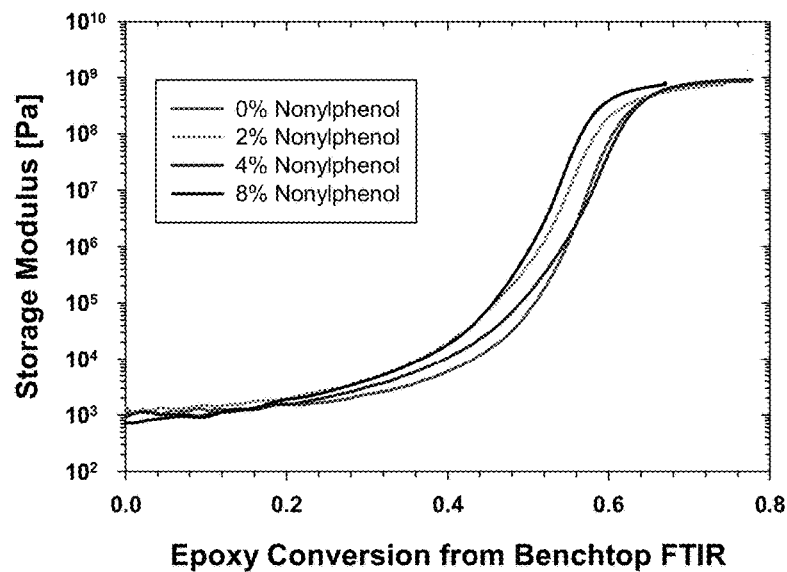
FIG. 11A is a graph of the cross-correlation between storage modulus and conversion, both measured at room temperature.
Figure 11B:
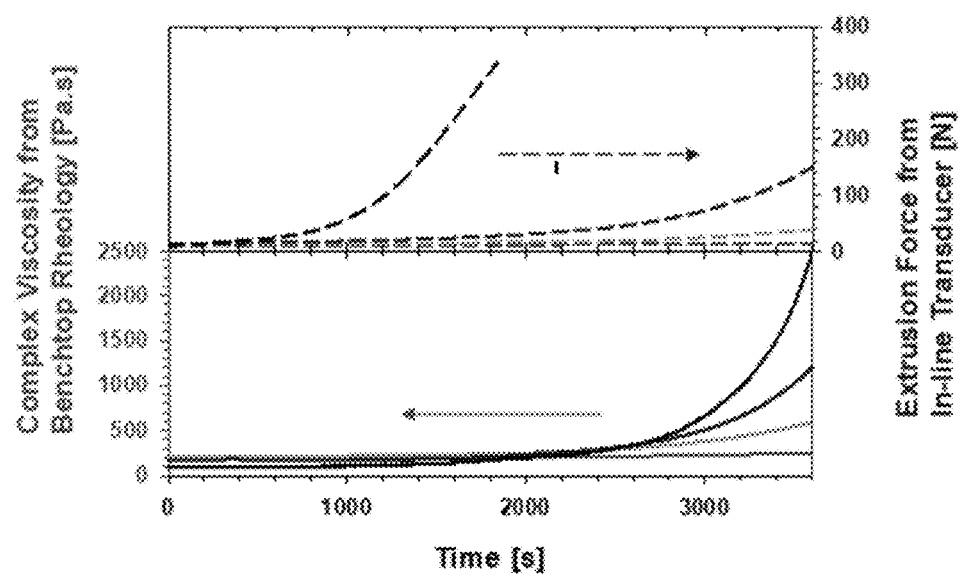
FIG. 11B is a graph of the cross-correlation between complex viscosity and in-print extrusion force, both measured at room temperature.

As the epoxy resin cures, significant increases in storage modulus (FIG. 10A) and viscosity (FIG. 10B) are expected. Additionally, FIG. 10C shows the time required for the storage modulus to become larger than the loss modulus, which approximately represents the gel point. See S. Mortimer et al., *Macromolecules* 34(9), 2973 (2001). As with the FTIR results (FIGS. 3A-3C), a higher nonylphenol concentration further accelerates the cure kinetics, with a ~40% reduction in estimated gel time between the 0 and 8% nonylphenol resins. In general, there is a good agreement between the benchtop FTIR epoxy conversion results and the storage modulus between all systems (FIG. 11A). However, comparing the in-print extrusion force to the viscosity measured by rheology (FIG. 11B) shows differing behaviors depending on nonylphenol concentration. As predicted from literature, there is a near linear correlation between the viscosity and extrusion force, aside from the initial plateau in viscosity. However, the slope of the lines differs significantly between the varying nonylphenol amounts, while the expected behavior would be a similar slope for all resins. The higher the nonylphenol concentration of the resin, the more the extrusion force increases compared to the viscosity, with the 8% system exhibiting a 25-fold increase in extrusion force during the print, while the offline rheology only shows a 4-fold increase. As the materials with higher nonylphenol concentrations are more strongly affected, it is likely that this stems from exothermic heating during print, which would accelerate the cure reaction. Thus, it is likely that there is some heating occurring also for the 4% sample. Again, such print-specific phenomena are difficult to predict in benchtop experiment, stressing the need for reliable process monitoring.

Spatially Resolving In-Print Parameters

The control software for the DIW printer offers time-resolved data of the printing stage position as well as the force, meaning that the properties, such as extrusion force or FTIR peak heights, can be spatially mapped and compared to visual inspection of the printed sample, for example via machine vision, to correlate process parameters to print artifacts. The machine vision system used an optical microscope to acquire images of printed samples. First, acquired images were compressed using color plane extraction to create a binary image. A dilation operation was then performed to highlight any anomalies more clearly within the print. The dilation structuring element was a 10-pixel diameter circle and was iterated once. Lastly, a feature detection method called Features from Accelerated Segment Test (FAST) was implemented. See E. Rosten and T. Drummond, Machine Learning for High-Speed Corner Detection, in: A. Leonardis, H. Bischof, A. Pinz (Eds.) *Computer Vision—ECCV 2006*, Springer Berlin Heidelberg, Berlin, Heidelberg, 2006, pp. 430-443. Here, feature points are discovered by comparing the pixel intensity value of each pixel point with the pixel intensity value of its nearby area. A minimum feature detection threshold of 60 pixels was chosen.

Figures 12A, 12B:
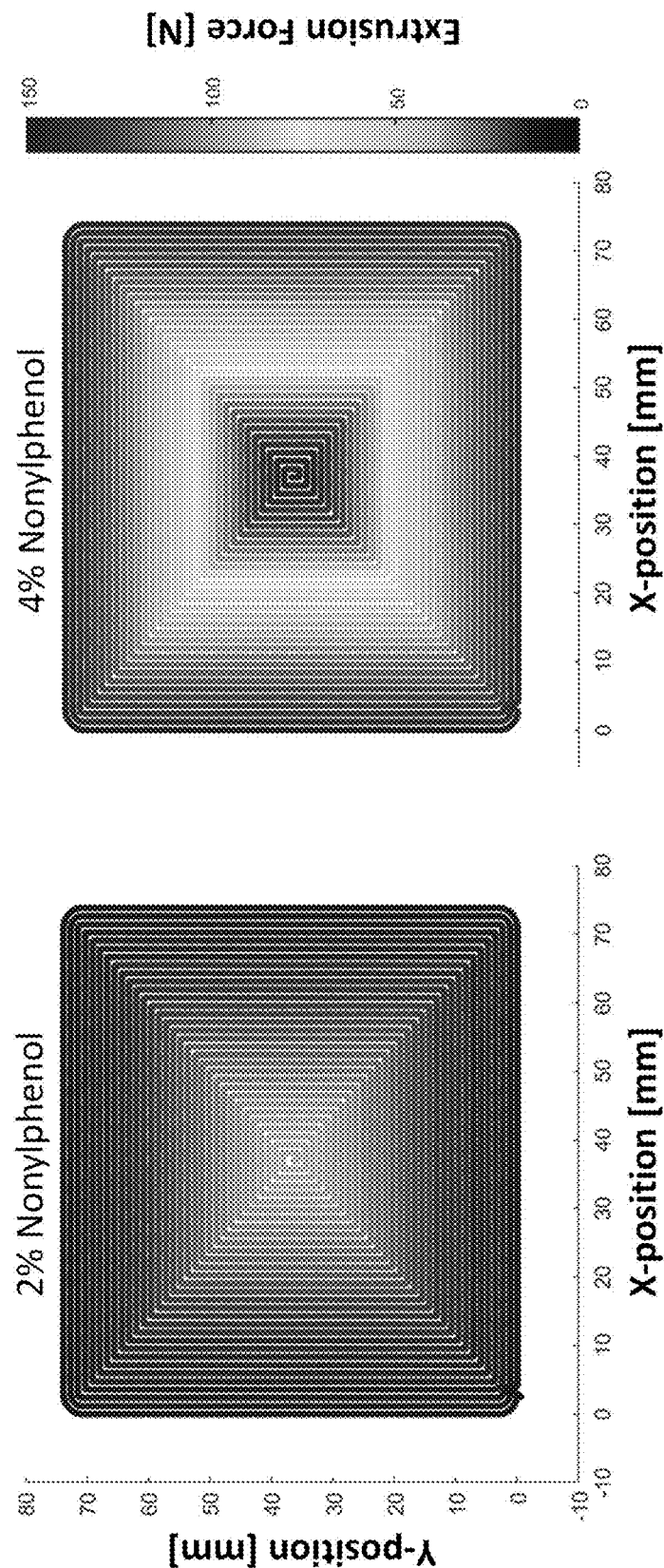
FIG. 12A is a map of extrusion force as a function of position during room temperature printing of an Epon 828/MXD system with 2% nonylphenol.
FIG. 12B is a map of extrusion force as a function of position during room temperature printing of an Epon 828/MXD system with 4% nonylphenol.
Figures 13A, 13B:
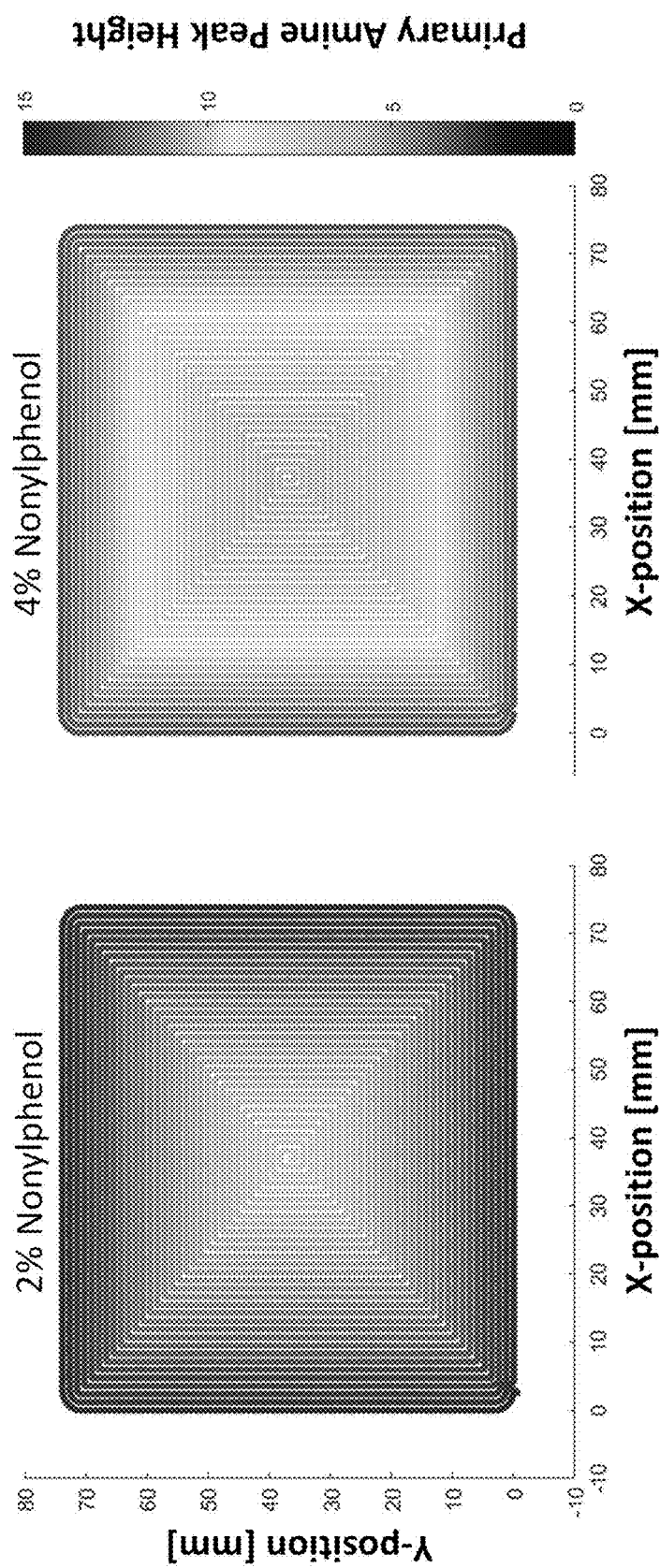
FIG. 13A is a map of amine peak height as a function of position during room temperature printing of an Epon 828/MXD system with 2% nonylphenol.
FIG. 13B is a map of amine peak height as a function of position during room temperature printing of an Epon 828/MXD system with 4% nonylphenol.

The analyses herein focused on the 2 and 4% nonylphenol inks, as the 0% system shows only small changes over the course of the print, and the 8% system was aborted before the print finished. The spatially resolved force maps for these two materials are shown in FIGS. 12A and 12B. The print starts on the outer edge of the square (lower left corner) and proceeds inwards, so the extrusion force increases towards the middle of the coupon. The extrusion force gradient is more apparent for the 4% system (FIG. 12B), as expected from the results shown in FIG. 7. There is, however, a visible gradient in the printed sample for the 2% system although at a lower magnitude. Other process data can be similarly mapped by correlating the time-dependent data to the printing stage position. For example, FIGS. 13A and 13B show the spatially resolved amine peak heights (based on the time-averaged dashed lines in FIG. 5A). As this is a more linear change with time, the gradient is similarly more continuous and visible for both systems. As mentioned earlier, a continuous print with a reactive system is not ideal but is useful for verifying the applicability of the flow-through IR cell concept. With the incorporation of a feed-back loop, the process (for example, extrusion rate, mix ratio in a two-component system, or temperature in a heated IR cell setup) can be controlled based on optimal parameters, which can be determined by coupling this spatial data to other local properties, such as visual artifacts or hardness, depending on the final application.

Capabilities of Machine Vision to Detect Artifacts and Anomalies

Figures 14A, 14B:
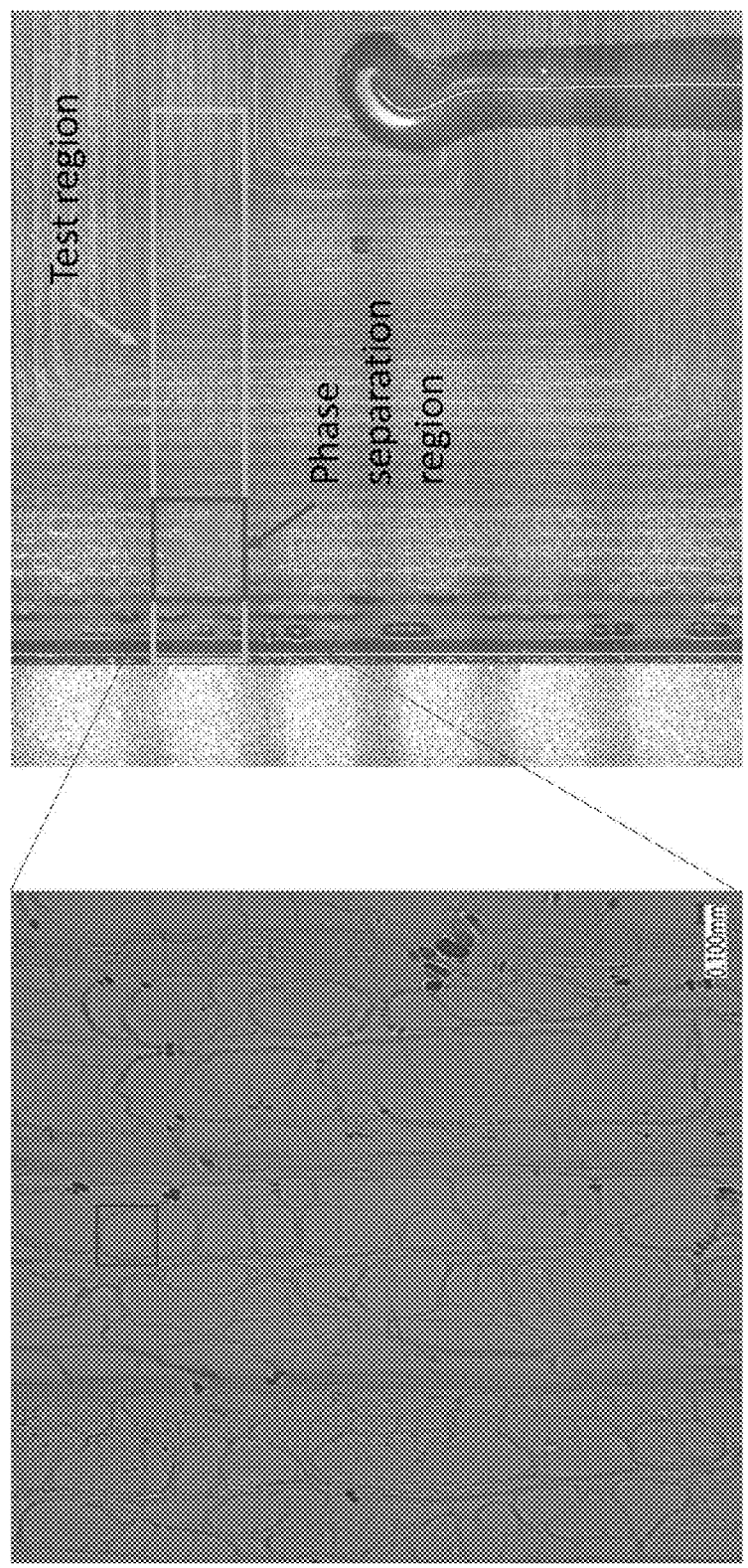
FIG. 14A-14B show results from a machine vision post-inspection (FIG. 14B), with a magnified area showing the regions of phase separation (FIG. 14A). The larger rectangle in FIG. 14B shows the region inspected for abnormalities using machine vision while the smaller rectangle shows the area with the highest density of distinct regions and the small rectangle in FIG. 15A indicates one specific region.
Figure 15A:
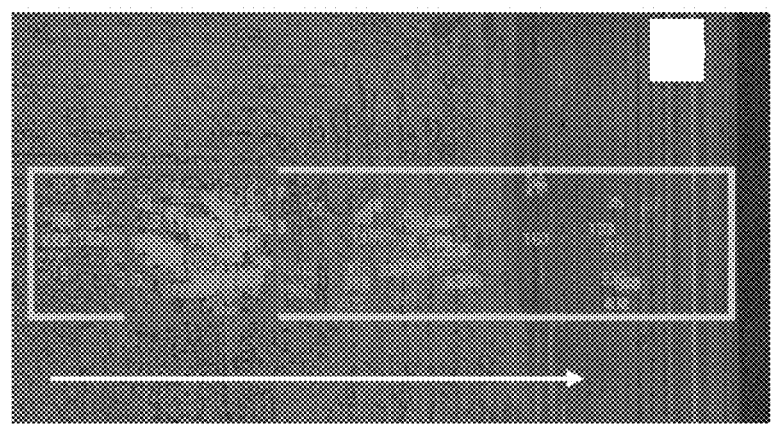
FIG. 15A shows machine vision identification of phase-separated regions in the sample containing 2% nonylphenol.
Figure 15B:
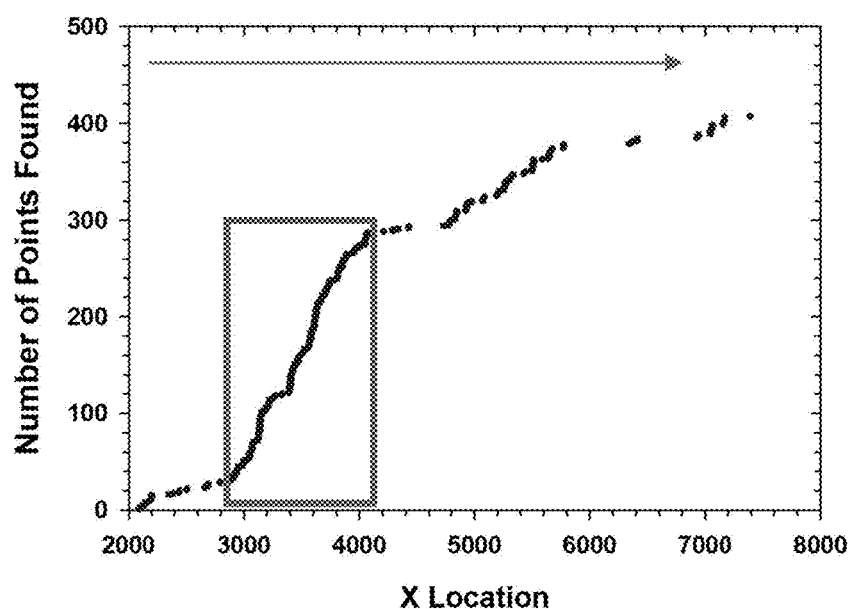
FIG. 15B is a graph of the corresponding cumulative distribution.
Figure 15C:
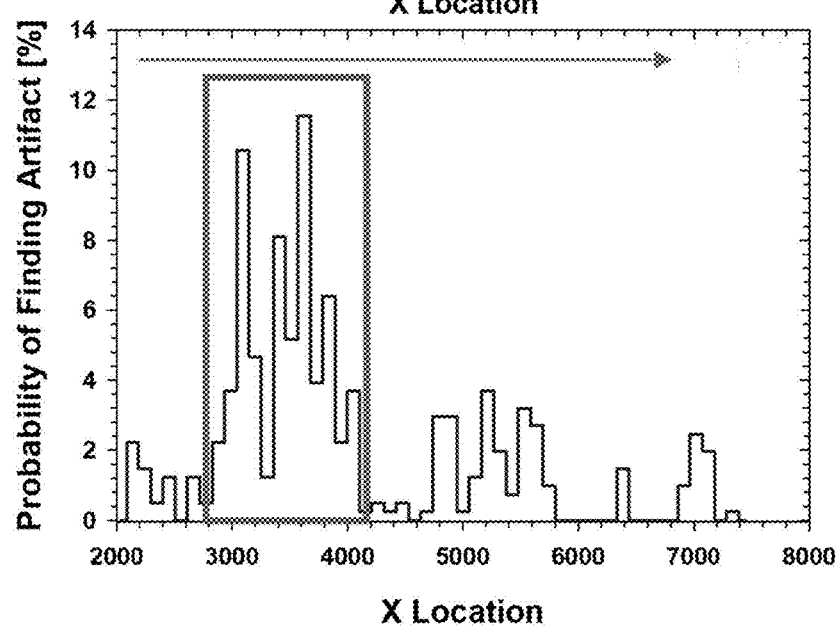
FIG. 15C is a histogram showing the probability of finding a defect. The smaller rectangle corresponds to the area with the highest concentration of discovered defects, and the arrow indicates the x direction.

Unaided visual inspection of the printed coupons did not reveal any significant heterogeneities in the material. However, when viewed under optical magnification, the samples exhibited regions of significant heterogeneities. Using a machine vision algorithm, these regions could be more easily identified and quantified. FIG. 14B show the machine vision results for the sample containing 4% nonylphenol, as well as a magnified image of the different regions (FIG. 14A), likely caused by phase separation during the print. From the microscopy picture, the regions can be estimated to be approximately 150-300 µm wide, with more variation in the height (along the printing direction). In addition, there is significant spatial variation in the density of phase separation regions identified. FIG. 15A shows the corresponding machine vision inspection of the sample containing 2% nonylphenol. Although the distribution is different, the spatial heterogeneity is clearly visible in this case. The corresponding profile is shown in FIG. 15B (where the points in FIG. 15A are reduced to a distribution along the x-axis, perpendicular to the print direction), and the probability histogram in FIG. 15C. In the 4% sample, the highest concentration of phase separated regions was found closer to the edge, whereas in the 2% sample this area was found near the middle. This suggests a clear time-dependence, and possibly conversion-dependence, of the distribution of the phase-separation regions. Nevertheless, the capability of machine vision algorithms to identify and quantify artifacts is apparent, and machine vision-based and in-line monitoring tool may provide real-time quality control of the printed parts.

Figure 16A:
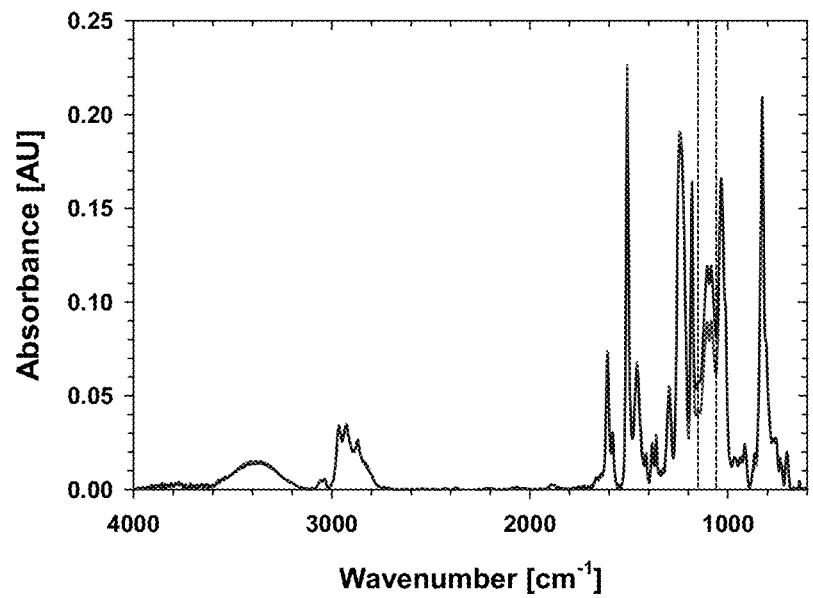
FIG. 16A shows surface spectra from two different points, with the highest and lowest ether peaks, of the printed coupon containing 2% nonylphenol.
Figure 16B:
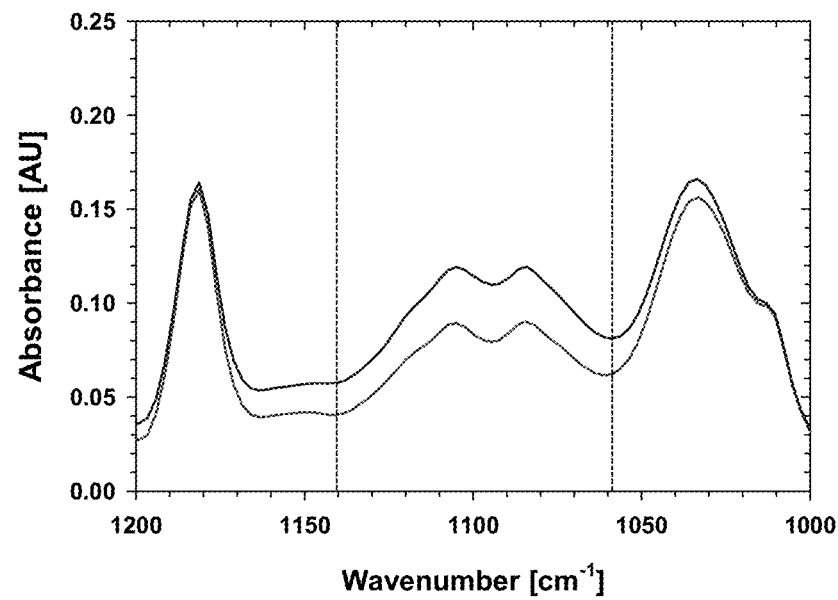
FIG. 16B shows the enlarged ether spectral region. The ether region is marked by vertical dashed lines.
Figures 17A, 17B:
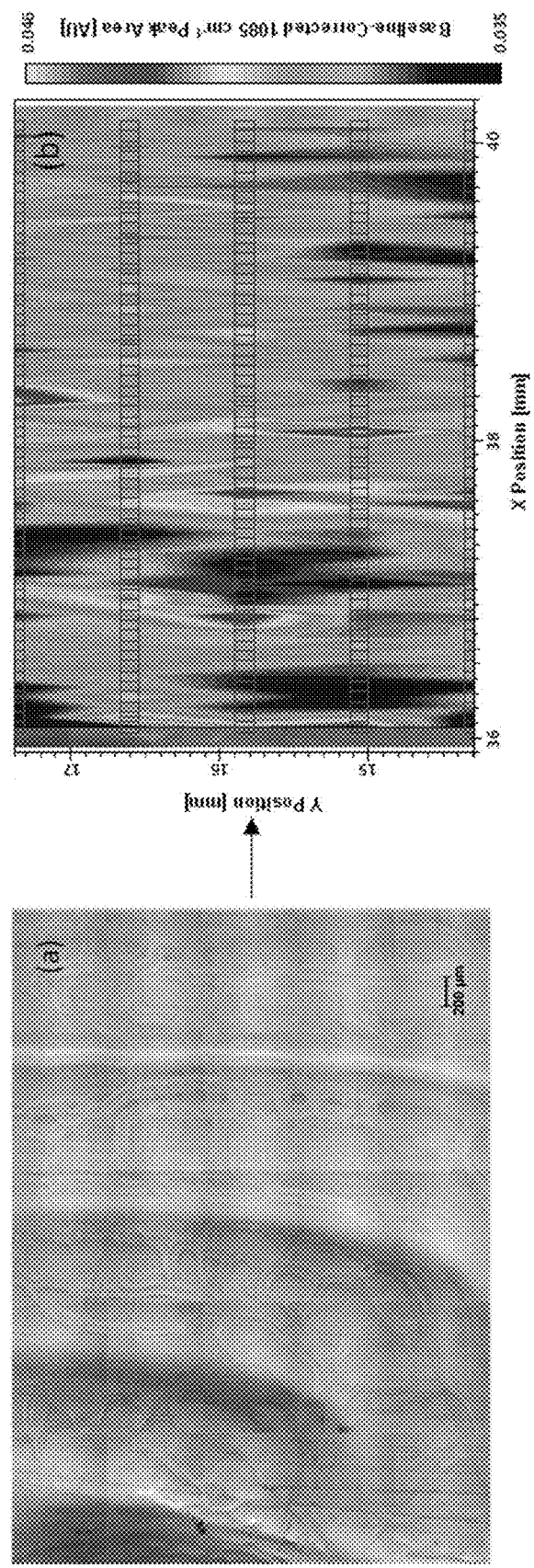
FIG. 17A is a composite microscopy image of the baseline-corrected ether peak area (1095 $cm^{-1}$) over a 4×3 mm area of the printed coupon containing 2% nonylphenol showing the significant variation in ether peak area over the measured area.
FIG. 17B is the corresponding map. The series of small rectangles correspond to measurement points. The colored regions are linearly interpolated in the y-direction between the neighboring points, including diagonally, and the height of the regions is therefore exaggerated.

FTIR Microscopy Characterization of Artifacts Identified Through Machine Vision After machine vision inspection, the printed coupons were removed from the build plates for FTIR analysis in an IR microscope equipped with a germanium ATR probe. FTIR microscopy was performed on the printed surface to confirm that phase-separation was the origin of the inhomogeneous regions identified by machine vision (FIGS. 14A-B and FIGS. 15A-C). Surface spectra of the printed coupons revealed spatial differences mainly in the ether band around 1100 cm$^{-1}$ (FIGS. 16A and 16B), which is indicative of epoxy homopolymerization, with a larger ether band corresponding to a higher degree of homopolymerization. See C. C. Price and D. D. Carmelite, *J. Am. Chem. Soc.* 88(17), 4039 (1966); and R. J. Morgan and E. T. Mones, *J. Appl. Polym. Sci.* 33(4), 999 (1987). While this is not conclusive proof, it suggests that the artifacts in the printed coupon are indeed caused by phase separation of the printed ink. It is unlikely that significant homopolymerization occurred during print (the reaction would be slow at room temperature), but over time, any phase separation would lead to regions with higher and lower epoxy concentration where more or less homopolymerization would take place. FIGS. 17A and 17B show the different regions near the center of the printed coupon with 2% nonylphenol (approximately corresponding to the area with the highest density of detected heterogeneities in FIG. 15A) in an area with approximate size of 4×3 mm. Each small rectangle in FIG. 17B represents one measurement point, with an x-resolution of ~65 µm. Thus, the phase separated regions are approximately 65-195 µm wide, in fair agreement with those seen in FIGS. 14A and 14B. A similar FTIR analysis of a cast sample of the same material (i.e. not subjected to shearing stresses during cure) showed significantly fewer phase separated areas, which may indicate that the extrusion process during cure influences the phase separation.

The present invention has been described as real-time process monitoring for direct ink write additive manufacturing. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A flow-through characterization cell for a direct ink write print head, comprising:
    a transparent flow channel disposed between an ink reservoir and a printing nozzle for flow of an ink therethrough;
    a light source for optical illumination of the ink flowing in the transparent flow channel;
    an optical spectrometer for detection of the light transmitted through or scattered by the ink flowing in the transparent flow channel; and
    a machine vision system for imaging of the printed ink, wherein the machine vision system correlates a spatially resolved property of the printed ink with a time-dependent property of the flowing ink.

2. The flow-through characterization cell of claim 1, wherein the light source comprises an infrared or Raman light source.

3. The flow-through characterization cell of claim 2, wherein the optical spectrometer comprises an infrared or Raman spectrometer.

4. The flow-through characterization cell of claim 3, wherein the detected light measures a property of the ink flowing in the transparent flow channel.

5. The flow-through characterization cell of claim 4, wherein the property comprises a chemical property.

6. The flow-through characterization cell of claim 1, wherein the ink comprises a thermosetting resin.

7. The flow-through characterization cell of claim 1, wherein the ink comprises a non-thermosetting resin.

8. The flow-through characterization cell of claim 1, further comprising a thermometer to measure a temperature of the ink.

9. The flow-through characterization cell of claim 1, further comprising a load cell for measuring an extrusion force required to extrude the ink through the printing nozzle.

10. The flow-through characterization cell of claim 1, further comprising a controller for controlling a process parameter based on a real-time measurement of a property of the flowing ink or the printed ink.

* * * * *